United States Patent
Crawford et al.

(10) Patent No.: US 6,561,742 B1
(45) Date of Patent: May 13, 2003

(54) LOADING AND UNLOADING APPARATUS FOR RAILCARS

(75) Inventors: Robert G. Crawford, St. Joseph, MO (US); Bert K. Ross, St. Joseph, MO (US)

(73) Assignee: Herzog Contracting Corp., St. Joseph, MO (US)

( * ) Notice: Subject to any disclaimer, the term of this patent is extended or adjusted under 35 U.S.C. 154(b) by 0 days.

(21) Appl. No.: 09/335,144

(22) Filed: Jun. 17, 1999

(51) Int. Cl.[7] .............................................. B65G 67/24
(52) U.S. Cl. ....................................... 414/339; 414/394
(58) Field of Search .................................. 414/339, 340, 414/345, 373, 391, 394; 212/301; 280/763.1

(56) References Cited

U.S. PATENT DOCUMENTS

| | | | | |
|---|---|---|---|---|
| 4,096,954 A | * | 6/1978 | Buckner | 414/339 |
| 4,128,180 A | * | 12/1978 | Mellious | 414/339 |
| 4,175,902 A | * | 11/1979 | Herzog et al. | 414/339 |
| 4,190,394 A | * | 2/1980 | Herzog et al. | 414/339 X |
| 4,479,750 A | * | 10/1984 | Johnson, Jr. | 414/339 X |
| 4,830,562 A | * | 5/1989 | Frederking | 414/339 |
| 5,066,188 A | * | 11/1991 | Bush | 414/339 |
| 5,488,788 A | * | 2/1996 | Durbin | 212/301 |
| 5,628,606 A | * | 5/1997 | Herzog et al. | 414/339 |
| 6,190,106 B1 | * | 2/2001 | Richardson et al. | 414/339 |

* cited by examiner

Primary Examiner—James W. Keenan
(74) Attorney, Agent, or Firm—Shook, Hardy & Bacon L.L.P.

(57) ABSTRACT

A railroad car loader/unloader apparatus includes a mobile machine adapted to operate atop an open top rail car. The apparatus includes a plurality of support subassemblies with surfaces adapted to engage upper surfaces of sidewalls of the rail car when the apparatus is positioned thereon. The support subassemblies are removable. The apparatus also includes a boom structure with a bucket attached at an end thereof. The apparatus can move atop the rail car on its own power, or by coordinated use of the boom structure to push or pull the apparatus along the rail car. In an alternative embodiment, rollers are attached to the support subassemblies in a position to engage the sidewall's upper surface to reduce travel friction.

14 Claims, 6 Drawing Sheets

LOADING AND UNLOADING APPARATUS FOR RAILCARS

BACKGROUND OF THE INVENTION

1. Field of the Invention

The present invention relates to an apparatus for handling materials, and more particularly to a mobile apparatus for loading and unloading open-top railcars.

2. Description of the Related Art

One method of loading and unloading open-top railcars has been to station large, fixed-base cranes or similar systems alongside railroad depots. However, loading and unloading must often be accomplished at a site remote from such a depot, such as during handling of cross-ties and track bed ballast for railroad construction or repair. Traditionally such unloading tasks have been accomplished via manual labor or by transporting large, highly specialized and expensive equipment to the job site. Manual labor has many disadvantages, including lack of efficiency and high expense. Alternatively, the costs of purchasing or renting expensive specialized equipment and the costs of transporting the equipment to each job site can also be prohibitive.

U.S. Pat. No. 4,175,902, titled APPARATUS FOR LOADING AND UNLOADING RAILROAD CARS, U.S. Pat. No. 4,190,394 titled METHOD FOR LOADING AND UNLOADING RAILROAD CARS, and U.S. Pat. No. 5,628,606, titled LOADING/UNLOADING APPARATUS FOR RAILROAD CARS, all to Stanley Herzog et al., are directed to an apparatus, a method, and an improved apparatus, respectively, for employing a specially adapted backhoe-like machine which has the capability to load or unload open-top railcars. In these patents, which are incorporated herein by reference, the specifically adapted machines, called "Cartoppers®" backhoes can be easily transported to remote sites, where they are capable, with a trained operator and a front bucket-mounted winch, of loading themselves onto the top of the railcar. The machines include a front boom and a rear boom with respective buckets attached thereto. The machines can then be moved along the top of each railcar as material, such as railroad ties, track ballast, coal or other material is unloaded from, or loaded onto, the cars.

U.S. Pat. No. 4,175,902 shows an apparatus for loading and unloading railroad cars and includes supports attached to the front bucket, and to a chassis behind an operator's cab. Center support feet added in U.S. Pat. No. 4,190,394 increase stability. U.S. Pat. No. 5,628,606 includes a pair of front support feet attached to a front bucket and a pair of swingable outrigger arms on the backhoe chassis behind the operator's cab with the front and rear support feet resting on and overhanging the upper surfaces of the railcar sidewalls when the apparatus is positioned atop it. A center support assembly including a beam provides improved stability, and the center support can be readily extended or retracted depending on the task being performed (i.e. extended for tasks atop the railcar, retracted for ordinary tasks unrelated to loading/unloading a railcar).

As indicated, the prior designs are capable of self-mounting the railcars by coordinated use of the front and rear booms. Once atop the railcars, movement along upper surfaces of sides of the cars is accomplished by alternately folding the rear boom and engaging the railcar's bottom surface and then unfolding the same to slide the front and rear supportive feet along the upper surfaces. The apparatus can also be moved in the opposite direction atop the cars by pulling with the rear boom. Alternatively, the apparatus can be moved by a winch attached to the front bucket.

While the prior designs have proven effective, a need remains for a railcar loading/unloading apparatus, such as a conventional trackhoe, that can be easily positioned and moved atop a railcar or system of railcars to load or unload the railcar's contents.

SUMMARY OF THE INVENTION

The present invention is directed to an apparatus for loading and unloading'railcars. Although the apparatus as described includes a trackhoe type machine, other machines such as a bulldozer, backhoe, or other mobile apparatus also could be used. The apparatus allows for relatively easy movement atop the railcar, and a relatively large bucket to handle greater loads. The apparatus includes an upper body and a lower body. The upper body includes an articulated boom with a material handling bucket attached thereto. The lower body includes a supportive chassis and a pair of track subassemblies for movement.

A plurality of support subassemblies are attached to the chassis and provide support and stability when the apparatus is positioned atop the railcar with the support subassemblies in positions to engage upper and outer surfaces of the railcar's sidewalls. The support subassemblies are readily removable.

The apparatus can mount a railcar via a ramp, or, alternatively, by climbing an end thereof. Once atop the railcar, movement is accomplished either directly by rotation of the track subassemblies, or, alternatively, by using the boom and bucket to push or pull the apparatus along the railcar.

In an alternative version, rollers are attached to the support subassemblies to afford easier movement by reducing travel friction when the support assemblies engage upper surfaces of the railcar's sidewalls.

OBJECTS AND ADVANTAGES OF THE INVENTION

The principle objects and advantages of the present invention include: providing an improved railcar loader/unloader apparatus; providing such an apparatus that can be readily positioned atop an open-top railcar; providing such an apparatus that is able to negotiate different materials once atop the railcar; providing such an apparatus with improved stability, versatility and load carrying capabilities; providing such an apparatus with improved mobility; providing such an apparatus with a plurality of support subassemblies; providing such support subassemblies which are readily removable; providing such an apparatus with rollers attached to the support subassemblies to reduce travel friction; and to provide such an apparatus which is safe, durable and reliable, and which is particularly well adapted for its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

I. Introduction and Environment

Figure 1:
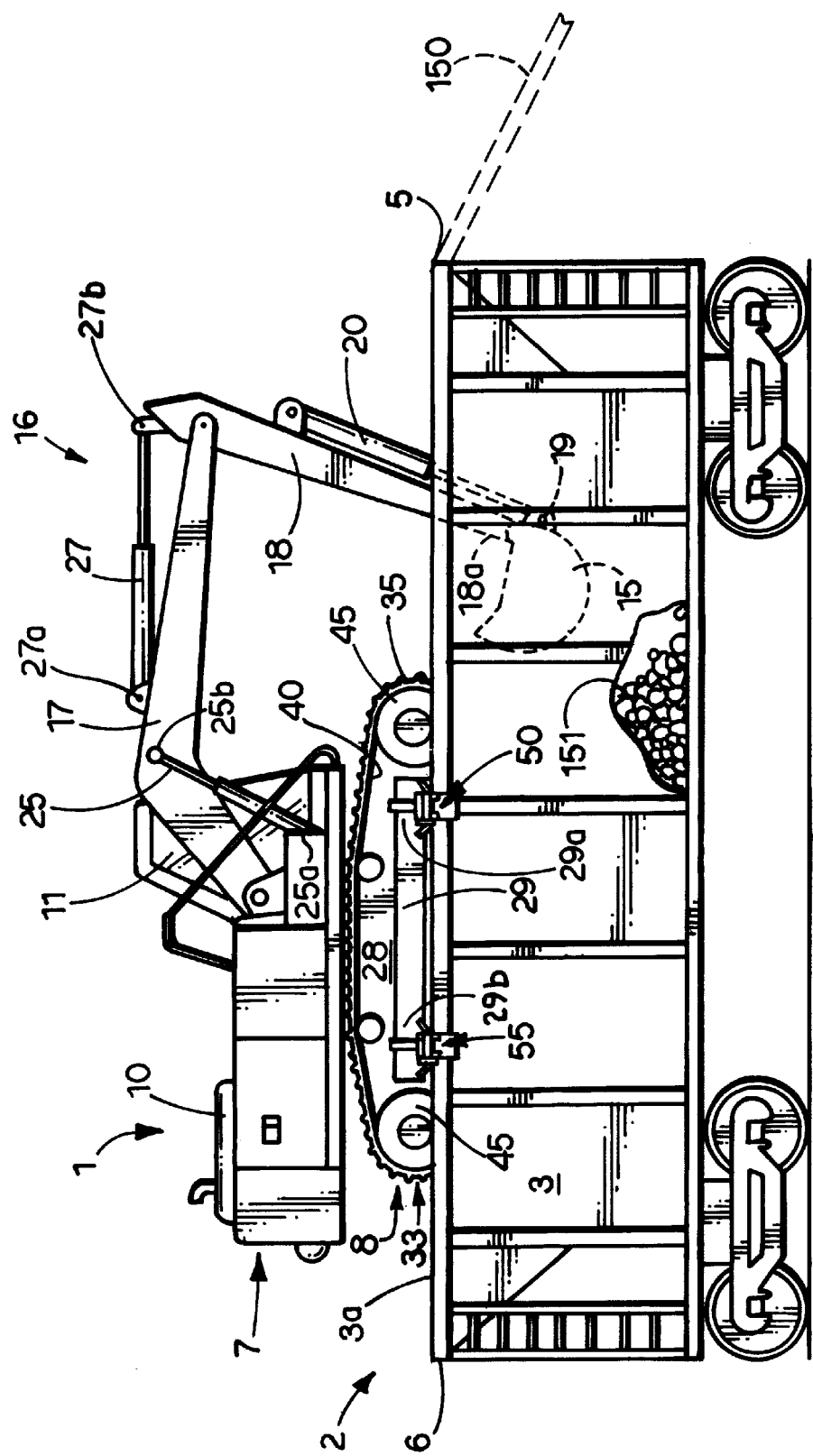
FIG. 1 is a side elevational view of a loading/unloading apparatus in position atop an open-top railcar.
Figure 1A:
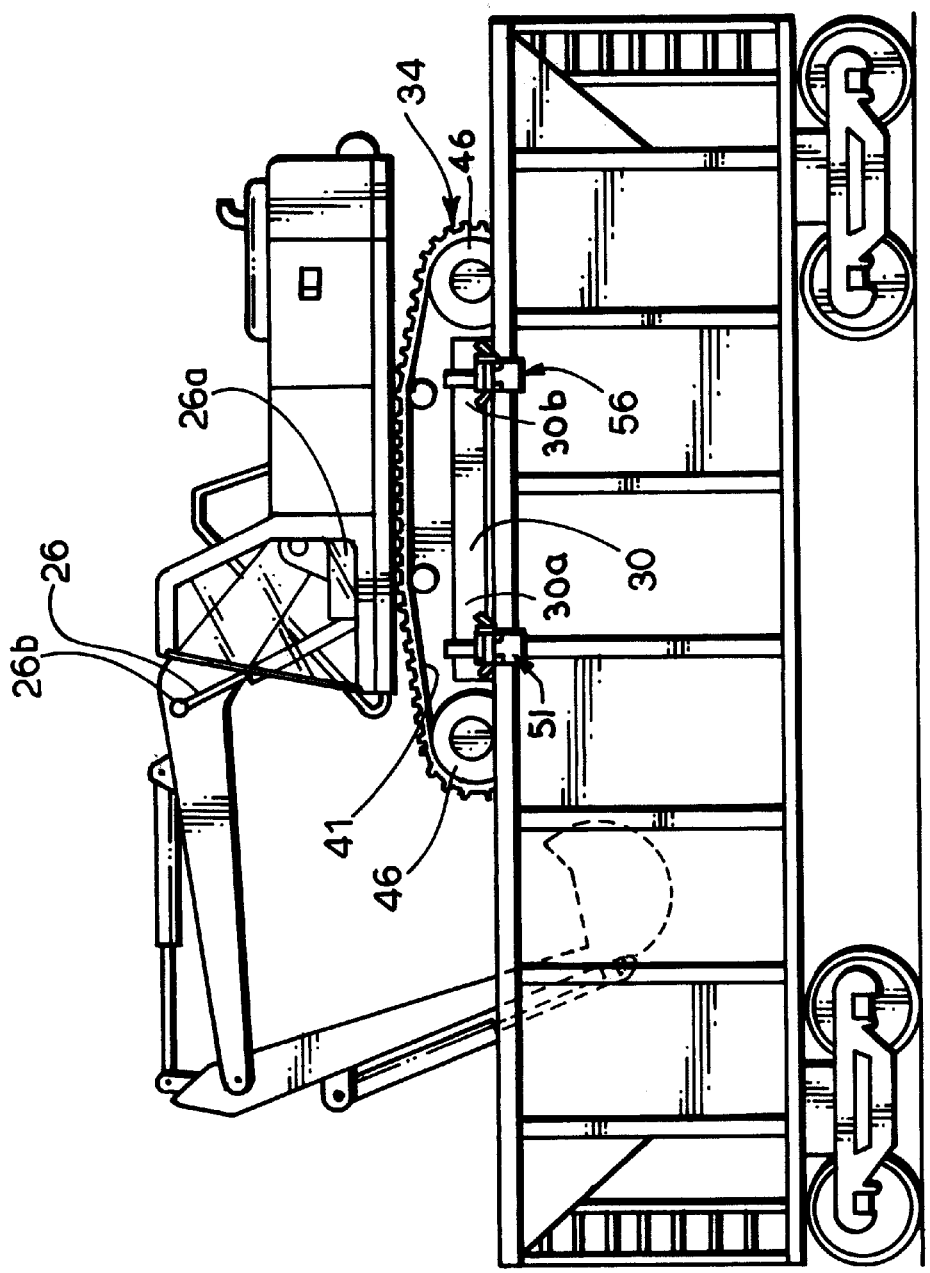
FIG. 1A is a side elevational view of the loading/unloading apparatus similar to FIG. 1, but with the apparatus moved on the railcar.
Figure 2:
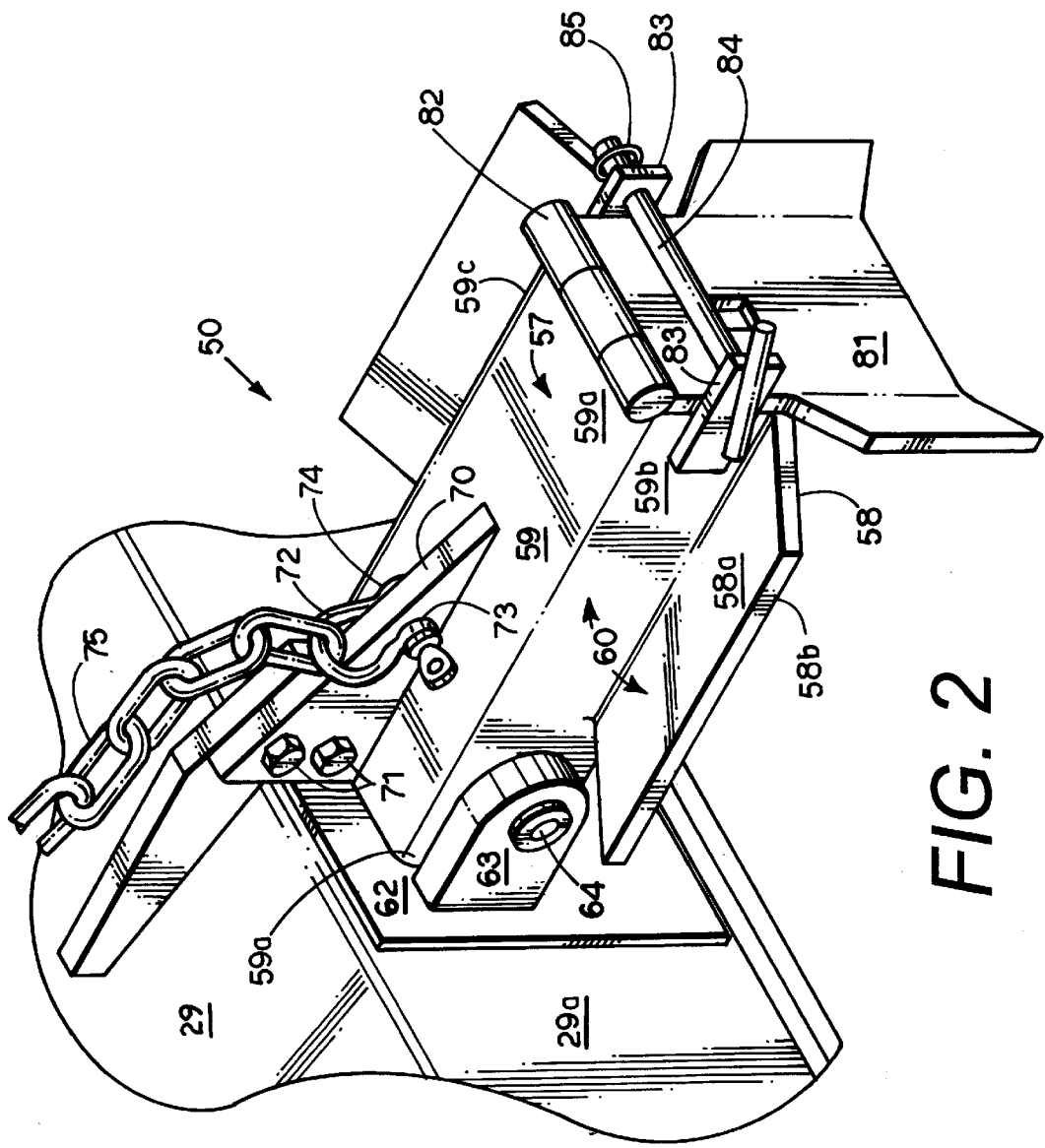
FIG. 2 is a perspective view of a support subassembly mounted to a chassis of the apparatus.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly", and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings and FIG. 1 in greater detail, the reference numeral 1 generally refers to a loader/unloader apparatus in accordance with the present invention. In FIG. 1, the apparatus 1 is shown positioned atop a conventional railcar 2 for loading or unloading operations. The railcar 2 includes a pair of spaced, parallel sidewalls 3,4 with upper surfaces 3a,4a and outer surfaces 3b,4b, and a pair of end walls 5,6.

While the apparatus 1 shown resembles a conventional trackhoe, a bulldozer, backhoe or other mobile apparatus can also be used. The apparatus includes an upper body 7 and a lower body 8. The upper body 7 includes a motor 10 and an operator's cab 11. The upper body 3 also includes a material engaging device or bucket 15 supported by an articulated two-piece boom 16. The boom 16 includes a proximate arm 17 and a distal arm 18. The bucket 15 is pivotally attached to a front end 18a of the distal arm 18 via a pivot mount 19. The bucket 15 is selectively pivotable about the pivot mount 19 via a bucket hydraulic drive cylinder 20. The proximate arm 17 is selectively movable via first and second boom hydraulic cylinders 25,26 mounted at respective ends thereof 25a,26a to a surface of the upper body 7 and at opposite ends 25b,26b to the proximate arm 17. The distal arm 18 is selectively movable via a third boom hydraulic cylinder 27 mounted at an end 27a of the proximate arm 17, and at an opposite end 27b thereof mounted on the distal arm 18.

The lower body 8 includes a supportive structure or chassis 28 with a pair of wings or beams 29, 30 interconnected by a center span 31. A turning gear 32 is attached by any suitable means, such as welding, between an upper surface of the center span 31 and a lower surface of the upper body 7 and allows the upper body 7 to turn or pivot 360° about a vertical axis relative the lower body 8.

A pair of track subassemblies 33,34 are mounted to the wings 29,30 respectively. The track subassemblies 33,34 each includes a respective outer track 35,36 driven by a system of chain subassemblies 40,41 attached to the outer tracks 35,36 respectively, and gear subassemblies 45,46 mounted to the wings 29,30 respectively. Under normal operating conditions (i.e. traveling on the ground) the apparatus 1 moves when the motor 10 supplies power to turn the gear subassemblies 45,46 which turn the chain subassemblies 40,41 and the outer tracks 35,36 respectively.

II. Support Bracket Subassemblies 50, 51, 55 and 56

Referring now to FIGS. 1, 1a, 2 and 5, in adapting the apparatus 1 for use as a loader/unloader to be positioned atop the railcar 2, a pair of front support bracket subassemblies 50 and 51 are attached at front portions 29a, 30a of the wings 29, 30 respectively. Similarly, a pair of rear support bracket subassemblies 55, 56 are attached at the wings' rear portions 29b, 30b respectively.

The support bracket pairs 50,51 and 55,56 are mirror images of one another. The support bracket subassemblies 50,51,55,56 are otherwise substantially identical. They are attached at different locations on the wings 29,30.

Therefore, this specification will only describe the support bracket subassembly 50, which is generally representative of the other support bracket subassemblies 51,55,56.

The support bracket subassembly 50 includes a support beam 57. The support beam 57 includes a lower plate 58 with upper and lower surfaces 58a, 58b respectively and is attached (e.g., welded) to a generally inverted trough-like member 59. Each end of the plate 58 is beveled at a 45° angle, as indicated at 60 on each of FIGS. 1, 1a, 2 and 5 to facilitate easier movement. A pair of bores (not shown) extend through opposite vertical sides 59b, 59c of a rear end of the upper member 59.

The support beam 57 is attached to the wing 29 by any suitable means. For example, a metal mounting plate 62 with a pair of bored receiving members 63 may be welded to a vertical edge near the front of the wing 29a. A pin assembly 64 may be inserted through the receivers 63 and the bores 61 to removably mount the support bracket subassembly 50 to the wing 29. For added support, a vertical gusset 70 extends upwardly from the upper member 59 and is welded along an edge thereto. The gusset 70 is also attached at an end thereof to the wing 29 by a plurality of bolts 71. A U-shaped lift ring 72 is attached to the gusset 70 by a pin connector 74 inserted through a bore 73 extending through the gusset 70. A chain 75, the purpose of which will be discussed later, may be attached at one end thereof to the ring 72 and at an opposite end thereof may be removably clamped to the wing 29.

Figure 4:
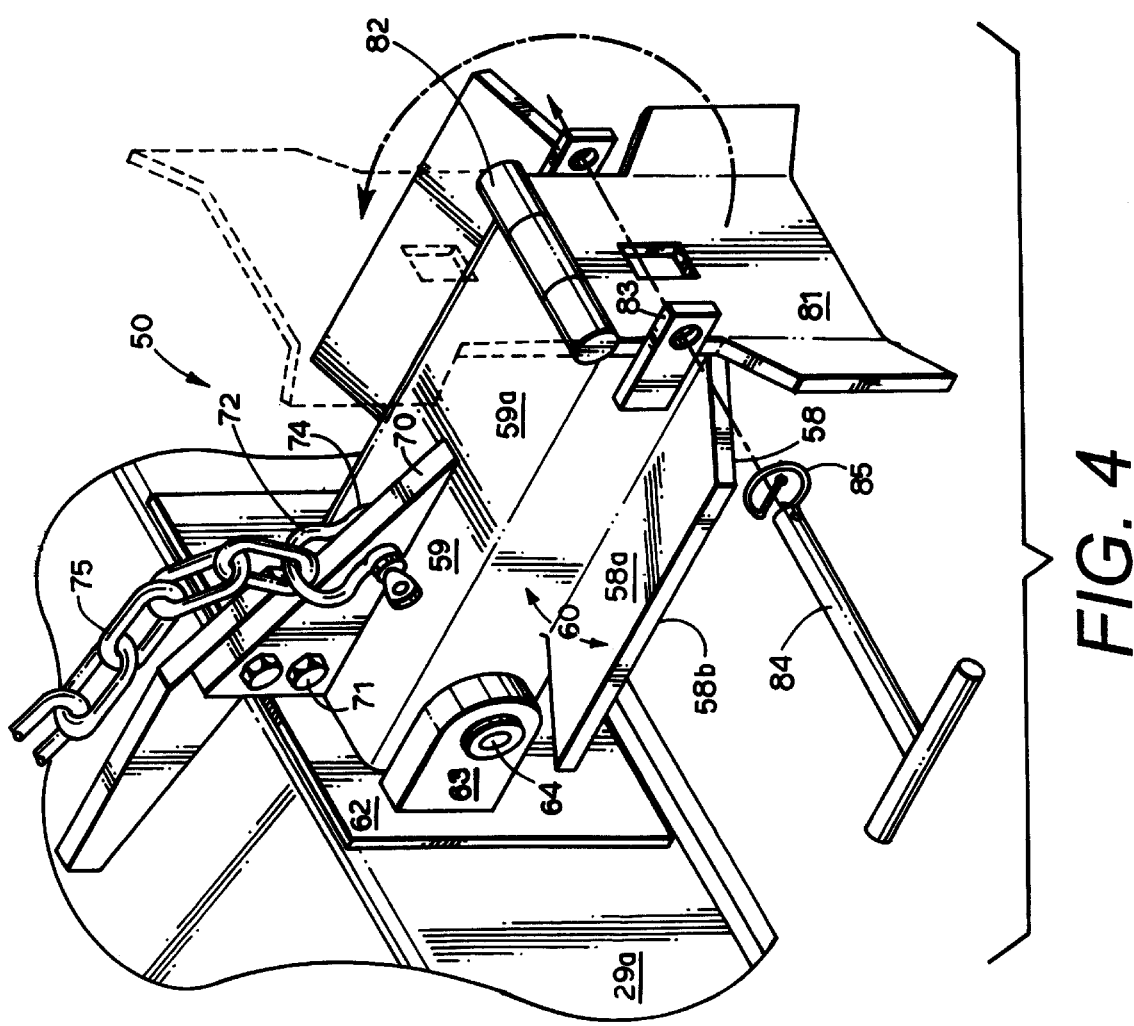
FIG. 4 is a perspective view of a support subassembly showing a vertical support plate in a downward position in solid lines, and in an upward position in phantom lines.
Figure 5:
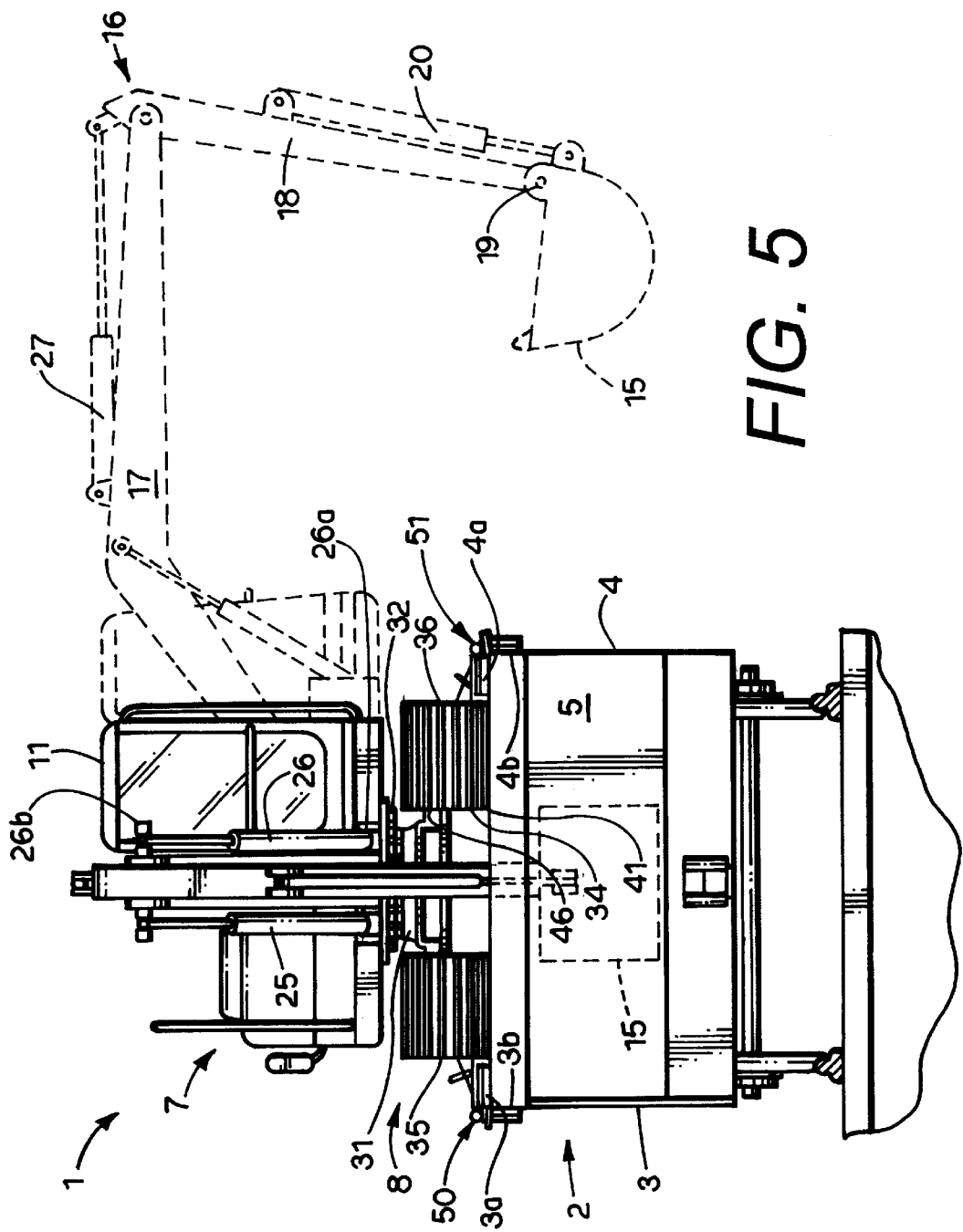
FIG. 5 is an end elevational view of the loading/unloading apparatus, with the broken lines showing the boom swung to the side.

A lateral support plate 81 is pivotally attached to an outer end 59a of the upper member 59 via a pivot arm 82. A plurality of locking pin receiving extensions 83 are attached to opposite vertical sides 59b) 59c of the outer end 59a of the upper member 59 and are sized to receive a locking pin 84. Referring to FIG. 4, the plate 81 is movable 180° between an upward position and a downward position by removing the locking pin 84 from the receiving extensions 83, swinging the plate up or down to the desired position, and reinserting the locking pin 84 to hold the plate in position. The locking pin 84 can be secured in its locking position by a removable clip 85 fastened to the end thereof. In the down position, the plate 81 will limit lateral sliding of the apparatus 1 atop the railroad car 2 by engaging outer sides thereof if the apparatus 1 moves too far to one side thereof. Both ends 81a, 81b of the support plate 81 are beveled at a 45° angle to facilitate movement in either direction atop the railcar 2.

The support bracket subassembly 50 can be removed from the apparatus 1. To facilitate removal, the bolts 71 and the pin assembly 64 are removed. The subassembly 50 is then removed from the wing 29, for example, by using the bucket 15 to lift the chain 75 with the support bracket subassembly 50 attached thereto.

III. Alternative Embodiment Support Subassembly 101

Figure 3:
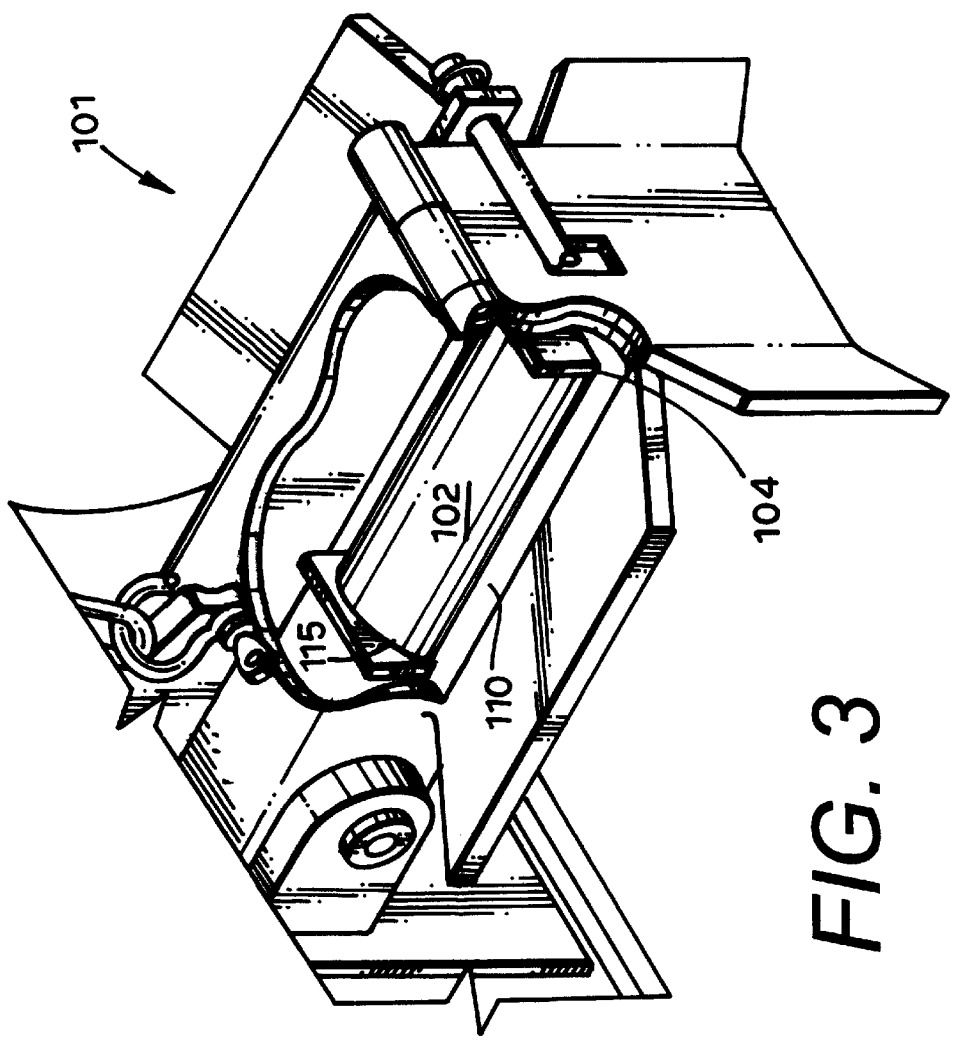
FIG. 3 is a sectional view of an alternative embodiment of the support subassembly including a roller subassembly.

Referring generally to FIG. 3, an alternative embodiment of the support bracket subassembly is indicated generally with the numeral 101, it being understood, again, that the support bracket subassembly 101 is generally representative of other support bracket subassemblies that may be attached to the wing support beams 29 and 30, as discussed previously. The support bracket subassembly 101 differs from the support bracket subassemblies 50, 51, 55 and 56 in the provision of a support roller 102. The roller 102 is positioned in a slot 104 in the bottom of a plate 110. A pair of press fit bearings 115 and 116 are attached to a top side of the plate 110 and the roller 102 extends therebetween via a roller shaft (not shown). The roller 102 may be positioned atop the upper surface 3a or 4a of the railcar's sidewalls 3 or 4, respectively, to facilitate movement of the apparatus 1 along the top of the railcar 2.

IV. Operation

The apparatus 1 may be positioned atop the railcar 2 via a ramp 150. Alternatively, if the railcar 2 is relatively low to the ground, the apparatus 1 can simply mount the railcar 2 by climbing its end wall. In any event, the apparatus 1 is mounted atop the railcar 2 with the lower surfaces of the plates 58 of the support bracket subassemblies 50, 51, 55 and 56 in positions to engage the upper surfaces 3a or 4a of the railcar sidewalls 3 or 4, respectively. Movement of the apparatus 1 along the railcar 2 varies depending on the contents 151 of the railcar 2. The apparatus 1 can travel directly across the contents 151 using the track subassemblies 33 and 34 when sufficient quantities of contents 151 are present. Alternatively, the apparatus 1 can be positioned atop the railcar 2 with the support bracket subassemblies 50, 51, 55 and 56 engaging respective upper edges 3a, 4a thereof. The apparatus 1 can then move atop the railcar 2 forward or backward by pushing or pulling the bucket 15 relative to the sidewalls 3, 4 or end walls 5, 6 of the railcar 2. The railcar's contents 151 can be loaded or unloaded with the bucket 15. The apparatus 1 dismounts the railcar 2 via the ramp 150 or, alternatively by simply climbing off the railcar 2 and onto the ground. Alternatively, the apparatus 1 can be positioned atop the railcar 2 with the support bracket subassemblies 50, 51, 55 and 56 engaging upper edges thereof. The apparatus 1 can then move atop the railcar 2 forward or backward by pushing or pulling the bucket 15 relative to the sidewalls 3, 4 or end walls 5, 6 of the railcar 2. The railcar's contents 151 can be loaded or unloaded with the bucket 15. The apparatus 1 dismounts the railcar 2 via the ramp 150, or, alternatively by simply climbing off the railcar 2 and onto the ground.

It is to be understood that while certain forms of the present invention have been illustrated and described herein, it is not to be limited to the specific forms or arrangement of parts described and shown.

What is claimed and desired to be secured by Letters patent is as follows:

1. An apparatus for loading and unloading an open top railroad car having spaced, parallel sidewalls with outer and upper surfaces and end walls, said apparatus being positionable upon the upper surfaces of the railroad car sidewalls and comprising:
    a) a mobile, powered apparatus having an upper body with front and rear ends and a lower body, said upper body being pivotally attached to said lower body, said lower body including a chassis with a pair of outer wings interconnected by a center span and a pair of track subassemblies attached to said wings, respectively, such that said apparatus is movable over a ground surface;
    b) a power actuated boom structure comprising a plurality of arms interconnected to form an articulated boom having first and second ends, said first end being pivotally mounted to said upper body front end, said second end having a material engaging device connected thereto, said boom structure being operable to handle materials for loading and unloading operations relative to a railroad car when said apparatus is positioned upon upper surfaces of the railroad car sidewalls;
    c) a plurality of support subassemblies each attached at an end thereof to said chassis near respective ends of said chassis wings, each said support subassembly including:
        i) a beam section with a supportive upper member having a pair of sidewalls and opposite ends, said supportive upper member being joined to a respective lower plate with opposite ends, said upper member including a pair of bores extending through said sidewalls near a junction of said chassis and said support subassembly, and
        ii) a vertical support member with opposite ends, said vertical support member being pivotally attached to one of said upper member ends; and
    d) connection means for removably connecting each said support subassembly to a respective wing, wherein each said connection means comprises:
        i) a pair of receiving brackets mounted to said chassis wing;
        ii) a pin subassembly including a pin for removably connecting each said support subassembly end to said receiving brackets by inserting said pin through said bores and said receiving brackets; and
        iii) a gusset with a lower edge and an end attached at said lower edge to said upper member and removably attached at said end to said respective wing.

2. The apparatus of claim 1 wherein one or more of said lower plate ends are beveled.

3. The apparatus of claim 1 wherein one or more of said vertical support plate ends are beveled.

4. The apparatus of claim 1 wherein at least one of said support subassemblies further comprises:
    a) an opening in said lower plate; and
    b) an elongate roller with opposing ends positioned within said opening and attached at said ends to said support subassembly.

5. An apparatus for loading and unloading an open top railroad car having spaced, parallel sidewalls with outer and upper surfaces and end walls, said apparatus comprising:
    (a) a mobile, powered apparatus having an upper body with front and rear ends, said apparatus being pivotally attached to a lower body, said lower body including a supportive chassis having a pair of opposing outer wings, each outer wing to be attached to a respective track subassembly enabling said apparatus to be movable over a ground surface;

(b) a power actuated boom structure having opposing first and second ends, said first end being pivotally mounted to said upper body front end, said opposing second end having a material engaging device formed thereon, said boom structure being operable to handle materials for loading and unloading operations relative to a railroad car;

(c) at least one support subassembly having opposing first and second ends, said at least one support subassembly including a beam section having a pair of opposing sidewalls formed therein and extending downwardly therefrom to form a respective lower edge, each of said sidewalls having a respective one of at least one pair of opposing sidewall apertures formed therethrough, said opposing sidewall apertures of each at least one pair being coaxially aligned with, and of substantially the same dimensions as, each other, said beam section having one end of a vertical support member pivotally attached thereto; and (d) connection means for removably connecting the at least one support subassembly to a predetermined portion of a respective wing, the connection means including a pair of receiving brackets mounted to said respective chassis wing, each of said brackets having a respective one of a pair of opposing bracket apertures formed therethrough, said bracket apertures being coaxially aligned with, and of substantially the same dimensions as, each other, said bracket apertures being spaced outwardly from said chassis wings a distance sufficient to permit coaxial alignment of said opposing bracket apertures with at least one of said at least one pair of opposing sidewall apertures, a pin subassembly including a pin for removably connecting one of the at least one support subassemblies to a respective pair of receiving brackets by inserting the pin through said opposing bracket apertures when said bracket apertures are coaxially aligned with at least one pair of said opposing sidewall apertures, said connection means further including a plurality of detachable fasteners connecting said at least one support subassembly to said respective chassis wing at a location offset from said sidewalls and brackets.

6. The apparatus of claim 5, wherein the at least one support subassembly includes a gusset having a lower edge affixed to said beam section substantially along the longitudinal axis of said beam section, said gusset having one end substantially proximate to an end of said beam section, said one end of said gusset being removably attached to said respective chassis wing by said detachable fasteners.

7. The apparatus of claim 5, wherein a substantially planar lower plate having opposing ends is affixed to said lower edge of at least one of said sidewalls.

8. The apparatus of claim 5, wherein said vertical support member is substantially planar and includes opposing edges, at least one of which is beveled along a portion of its length.

9. The apparatus of claim 5, further comprising:
a) an opening in said at least one support assembly; and
b) an elongate roller with opposing ends positioned within said opening and attached at said ends to said at least one support assembly.

10. An apparatus for loading and unloading an open top railroad car having spaced, parallel sidewalls with outer and upper surfaces and end walls, said apparatus being positionable upon the upper surfaces of the railroad car sidewalls and comprising:
a) a mobile, powered apparatus having an upper body with front and rear ends and a lower body, said upper body being pivotally attached to said lower body, said lower body including a chassis with a pair of outer box beams interconnected by a rigid center span and a pair of track subassemblies attached to said box beams, respectively, such that said apparatus is movable over a ground surface, said box beams being substantially parallel on opposite sides of said chassis;
b) a power actuated boom structure having first and second ends, said first end being pivotally mounted to said upper body front end, said second end having a material engaging device connected thereto, said boom structure being operable to handle materials for loading and unloading operations relative to a railroad car;
c) a plurality of support subassemblies engagable with an upper surface of a railroad car sidewall to support said apparatus on the railroad car, each said support subassembly including a beam section with a supportive upper member having a pair of sidewalls and first and second opposite ends, each said supportive upper member being joined to a respective lower plate with opposite ends, each said supportive upper member including a pair of bores extending through said sidewalls proximate said upper member first end; and
d) connection means for removably connecting each said support subassembly to a respective one of said box beams, said connection means comprising:
i) a pair of receiving brackets fixedly mounted to said respective box beam; and
ii) a pin for removably connecting each said support subassembly first end to said receiving brackets by inserting said pin through said bores and said receiving brackets.

11. The apparatus set forth in claim 10 wherein at least one of said lower plate ends is beveled.

12. The apparatus of claim 10 wherein said connection means further includes a gusset with a lower edge and an end, said gusset being fixedly attached at said lower edge to said supportive upper member and removably attached at said end to said respective box beam.

13. The apparatus of claim 10 wherein each said support subassembly further includes a vertical support member with opposite ends, said vertical support member being pivotally attached to said supportive upper member second end.

14. The apparatus set forth in claim 13 wherein at least one of said vertical support plate ends is beveled.

* * * * *